United States Patent
Lim et al.

(10) Patent No.: US 9,865,193 B2
(45) Date of Patent: Jan. 9, 2018

(54) IMAGE DISPLAY APPARATUS AND IMAGE DISPLAY METHOD FOR REDUCING POWER CONSUMPTION

(71) Applicant: SAMSUNG ELECTRONICS CO., LTD., Suwon-si (KR)

(72) Inventors: Sung-jin Lim, Seoul (KR); Sung-soo Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 48 days.

(21) Appl. No.: 14/813,366

(22) Filed: Jul. 30, 2015

(65) Prior Publication Data

US 2016/0042682 A1    Feb. 11, 2016

(30) Foreign Application Priority Data

Aug. 8, 2014  (KR) .................. 10-2014-0102233

(51) Int. Cl.
*G09G 3/20* (2006.01)
*H04N 5/63* (2006.01)

(52) U.S. Cl.
CPC ............ *G09G 3/2096* (2013.01); *G09G 3/20* (2013.01); *H04N 5/63* (2013.01); *G09G 2310/04* (2013.01); *G09G 2320/0257* (2013.01); *G09G 2330/022* (2013.01); *G09G 2330/026* (2013.01);
(Continued)

(58) Field of Classification Search
CPC .... G09G 3/2096; G09G 3/20; G09G 2310/04; G09G 2320/0257; G09G 2330/021; G09G 2330/022; G09G 2330/026; G09G 2340/125; G09G 2370/22; H04N 5/63; G06F 1/3265; G06F 1/3206; G06F 1/3218; G06F 1/3228
See application file for complete search history.

(56) References Cited

U.S. PATENT DOCUMENTS

| | | |
|---|---|---|
| 1,039,436 A | 9/1912 | Peterson |
| 5,867,140 A | 2/1999 | Rader |
| 6,486,900 B1 | 11/2002 | Shen et al. |

(Continued)

FOREIGN PATENT DOCUMENTS

| | | |
|---|---|---|
| EP | 1809032 A1 | 7/2007 |
| JP | 2006-41588 A | 2/2006 |

(Continued)

OTHER PUBLICATIONS

Communication dated Feb. 1, 2016, issued by the European Patent Office in counterpart European Application No. 15180237.8.
(Continued)

*Primary Examiner* — Tom Sheng
(74) *Attorney, Agent, or Firm* — Sughrue Mion, PLLC

(57) ABSTRACT

Provided herein is an image display apparatus including a receiver configured to receive first image data; a signal processor configured to process the received first image data; an outputter configured to output the processed first image data; a storage configured to store second image data; and a controller configured to cut off power supplied to at least one component from among components of the image display apparatus and to control the outputter to output the stored second image data to an area of a screen, in response to the image display apparatus entering a power saving mode.

29 Claims, 12 Drawing Sheets

(52) U.S. Cl.
CPC ... *G09G 2340/125* (2013.01); *G09G 2370/22* (2013.01)

(56) References Cited

U.S. PATENT DOCUMENTS

| | | | | |
|---|---|---|---|---|
| 6,593,930 | B1* | 7/2003 | Sheaffer | G09G 5/18 345/213 |
| 7,391,405 | B2* | 6/2008 | Ahn | G09G 5/006 345/100 |
| 8,749,711 | B2 | 6/2014 | Um | |
| 2003/0011586 | A1* | 1/2003 | Nakajima | G09G 3/3696 345/211 |
| 2004/0080500 | A1* | 4/2004 | Koyama | G09G 5/18 345/204 |
| 2004/0222951 | A1* | 11/2004 | Lee | G09G 3/3208 345/77 |
| 2005/0060669 | A1 | 3/2005 | Lowles | |
| 2005/0071702 | A1* | 3/2005 | Morisawa | G06F 1/3203 713/320 |
| 2005/0140566 | A1* | 6/2005 | Kim | G06F 3/1431 345/1.1 |
| 2005/0160302 | A1* | 7/2005 | Asakura | G06F 1/3203 713/320 |
| 2006/0087503 | A1* | 4/2006 | Sasaki | G09G 5/00 345/211 |
| 2006/0227122 | A1 | 10/2006 | Proctor | |
| 2007/0046618 | A1* | 3/2007 | Imai | G06F 1/3265 345/102 |
| 2007/0266345 | A1* | 11/2007 | Cok | G09G 3/3216 715/867 |
| 2008/0143695 | A1* | 6/2008 | Juenemann | G09G 3/3611 345/204 |
| 2009/0115767 | A1* | 5/2009 | Chang | G06F 1/3218 345/212 |
| 2009/0213033 | A1* | 8/2009 | Chen | G09G 3/3611 345/1.1 |
| 2009/0288126 | A1* | 11/2009 | Candelore | G09G 3/20 725/110 |
| 2009/0322969 | A1 | 12/2009 | Unger | |
| 2010/0321647 | A1* | 12/2010 | Schuler | G06F 1/3203 353/121 |
| 2011/0249022 | A1* | 10/2011 | Poornachandran | G06F 1/3203 345/619 |
| 2013/0002596 | A1* | 1/2013 | Ke | G06F 1/3203 345/173 |
| 2013/0093777 | A1* | 4/2013 | He | G06F 1/3265 345/522 |
| 2014/0085276 | A1 | 3/2014 | Jang et al. | |
| 2014/0157211 | A1* | 6/2014 | Tian | G06F 3/14 715/867 |
| 2014/0253537 | A1* | 9/2014 | Lee | G09G 5/12 345/214 |
| 2015/0100813 | A1* | 4/2015 | Han | G09G 5/02 713/340 |
| 2015/0149802 | A1* | 5/2015 | Vayrynen | G06F 1/3265 713/323 |
| 2015/0187340 | A1* | 7/2015 | Ozawa | G09G 5/393 345/545 |
| 2015/0301836 | A1* | 10/2015 | Chung | G06F 9/4406 713/2 |
| 2015/0370458 | A1* | 12/2015 | Chen | G06F 3/04845 715/727 |

FOREIGN PATENT DOCUMENTS

| | | |
|---|---|---|
| KR | 10-2004-0025375 A | 3/2004 |
| KR | 10-2008-0022276 A | 3/2008 |
| KR | 10-2011-0060505 A | 6/2011 |
| KR | 10-2014-0039524 A | 4/2014 |
| WO | 02069313 A2 | 9/2002 |

OTHER PUBLICATIONS

Communication dated Oct. 9, 2015, issued by the European Patent Office in counterpart European Application No. 15180237.8.

* cited by examiner

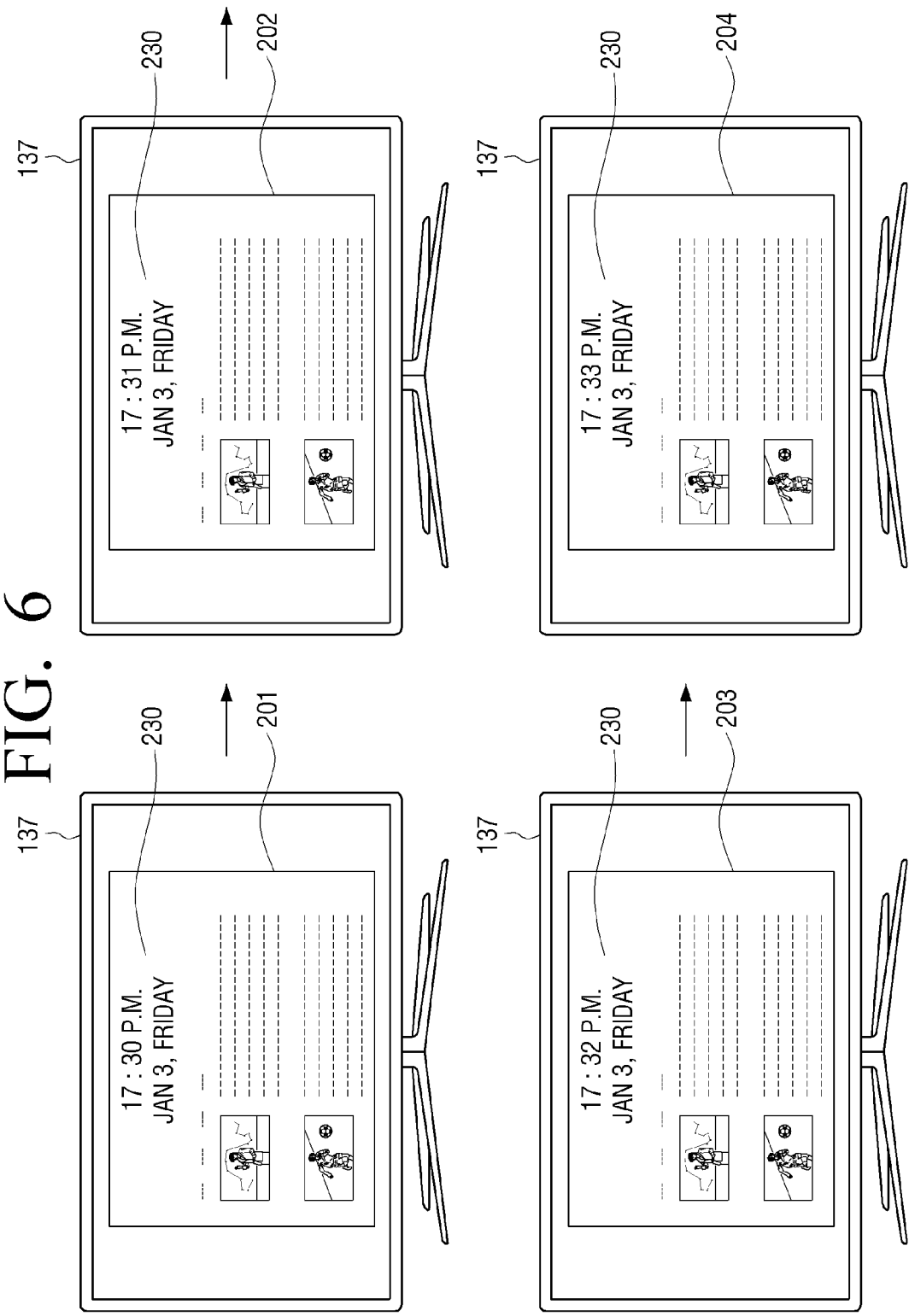

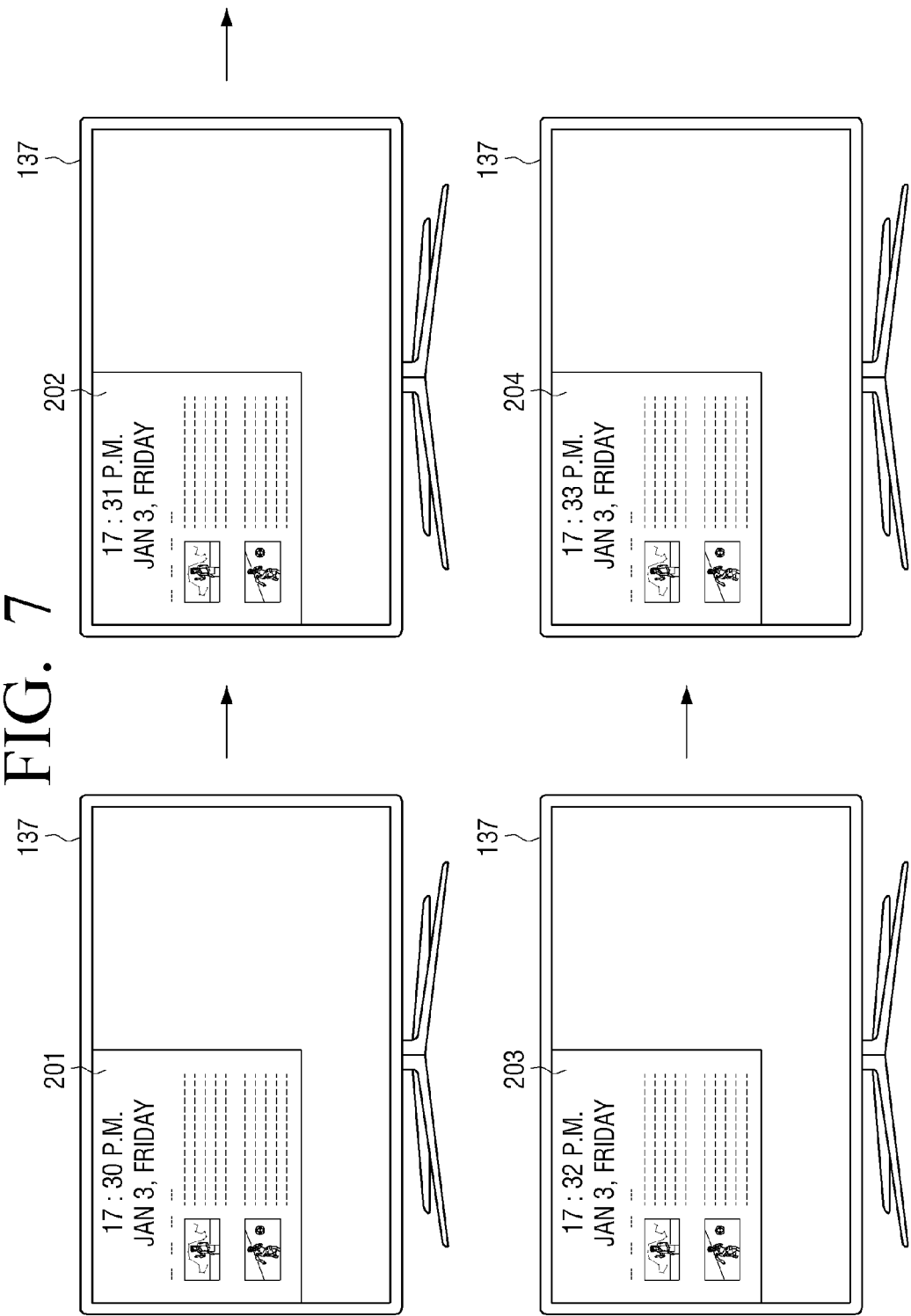

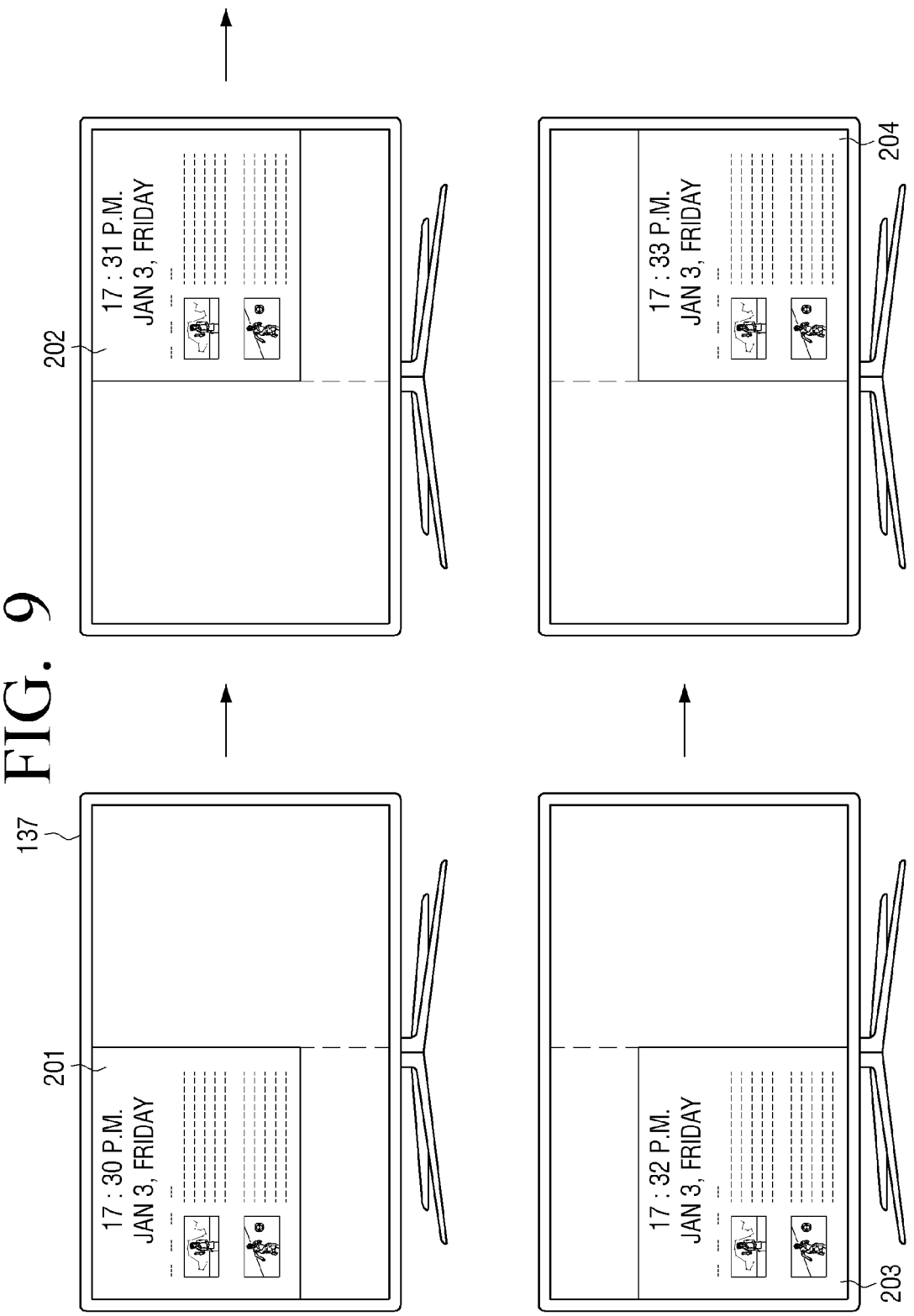

t2 + t3 < t1 + t2

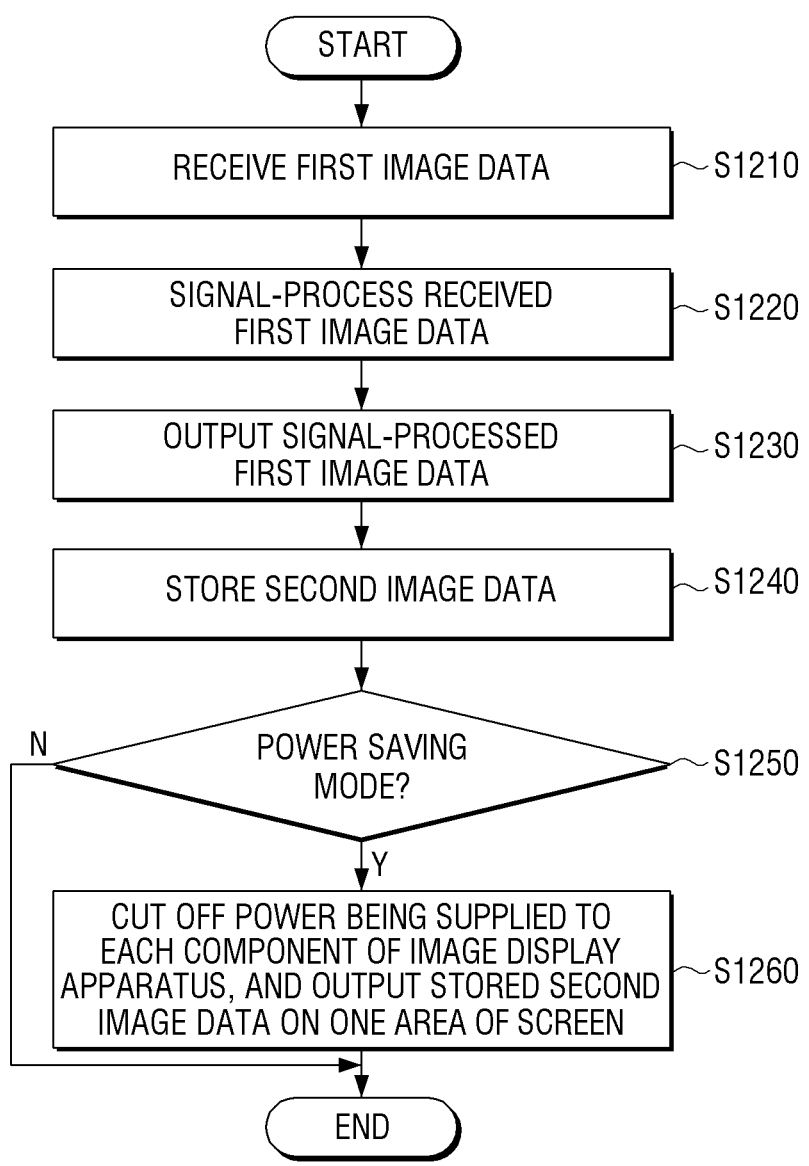

IMAGE DISPLAY APPARATUS AND IMAGE DISPLAY METHOD FOR REDUCING POWER CONSUMPTION

CROSS-REFERENCE TO RELATED APPLICATION

This application claims priority from Korean Patent Application No. 10-2014-0102233, filed on Aug. 8, 2014 in the Korean Intellectual Property Office, the disclosure of which is incorporated herein in its entirety by reference.

BACKGROUND

1. Field

Methods and apparatuses consistent with exemplary embodiments relate to an image display apparatus and an image display method, and more particularly, to an image display apparatus and an image display method capable of substantially saving power consumption.

2. Description of the Related Art

Cathode ray tubes (CRTs) have been widely used in display apparatuses such as televisions (TVs) and computer monitors. However, CRTs use a method of emitting cathode electrons from an electron gun to glass wool covered with a fluorescent material to generate light, and thus have large sizes, which is disadvantageous. Thus, a flat panel display (FPD) technology emerged, which drastically reduces the thickness of a display apparatus.

Examples of flat panel displays include a liquid crystal display (LCD) that uses a liquid crystal, a plasma display panel (PDP) that emits light by using a principle of gas discharge such as that employed in neon signs, an organic light emitting diode (OLED) panel that emits light by applying a current to a fluorescent organic compound, a field emission display (FED), an electro luminescence display (ELD), and so forth.

Various technologies are proposed to reduce power consumption in flat panel displays. However, as the size of display panels increases and the resolution becomes higher, the power saving technologies proposed in the related art have limits to substantially reducing power consumption. Therefore, there is a need for a method that may substantially reduce power consumption in a display apparatus.

SUMMARY

One or more exemplary embodiments provide an image display apparatus capable of substantially reducing power consumption of the display apparatus.

According to an aspect of an exemplary embodiment, there is provided an image display apparatus including: a receiver configured to receive first image data; a signal processor configured to process the received first image data; an outputter configured to output the processed first image data; a storage configured to store second image data; and a controller configured to cut off power supplied to at least one component from among components of the image display apparatus and to control the outputter to output the stored second image data to an area of a screen, in response to the image display apparatus entering a power saving mode.

The controller may cut off power supplied to the signal processor, and control the outputter to output the stored second image data to the area of the screen, in response to the image display apparatus entering the power saving mode.

The signal processor may include at least one of an audio/video (A/V) decoder, a scaler, a frame rate converter and a video enhancer, and the outputter may include a timing controller.

The controller may cut off power supplied to at least one from among the receiver, the A/V decoder, scaler and the video enhancer, in response to the image display apparatus entering the power saving mode.

The storage may be a memory included in the frame rate converter.

The storage may be a memory included in the timing controller.

The image display apparatus may enter the power saving mode, in response to an elapse of a predetermined period of time during which the first image data are not received.

The image display apparatus may enter the power saving mode in response to receiving a predetermined control signal from a remote control apparatus.

The image display apparatus may enter the power saving mode in response to the receiver continuously receiving the same image data.

The controller may control the outputter to output the stored second image data to at least one area from among a plurality of areas of the screen in a predetermined time interval.

The controller may control the outputter to turn off at least one of a backlight and a gate driver corresponding to at least one of an area of the screen in which a data driver of the outputter outputs the stored second image data and another area of the screen in which the data driver does not output the stored second image data.

The second image data may include a plurality of image data, and the controller may control the outputter to independently output each of the plurality of image data to the area of the screen.

The plurality of image data may include time information that is different from one another.

The controller may supply or cut off power to or from the at least one component of the image display apparatus in a predetermined time interval, to update the second image data stored in the storage when the power is supplied to the at least component of the image display apparatus, in response to the image display apparatus entering the power saving mode.

The controller may control such that the second image data are stored in the storage before a booting of the image display apparatus is performed, and control the outputter to output the stored second image data to the area of the screen, in response to the image display apparatus being turned on.

The controller, in response to a conversion of a frame rate or a mode conversion between a two dimensional (2D) image mode and a three dimensional (3D) image mode of the image display apparatus, and control the outputter to output the stored second image data to the area of the screen.

The controller may cut off power supplied to an input end of the signal processor, and control the outputter to output the stored second image data to the area of the screen, in response to the image display apparatus entering the power saving mode.

The controller may control at least one of the signal processor and outputter to adjust at least one of a gamma voltage, a display driving voltage, a frame rate, a backlight light emitting time, a clock, and a resolution, in response to the image display apparatus entering the power saving mode.

In response to the image display apparatus entering the power saving mode, the controller may control the at least one of the signal processor and the outputter to adjust the at least one of the gamma display driving voltage, the frame rate, the backlight light emitting time, the clock, and the resolution in a blank section in which the second image data are not output according to adjustment of the frame rate.

The apparatus may further include a sensor configured to sense a presence of a viewer, wherein the controller controls the outputter to output the second image data that are different according to a result of sensing of the sensor.

According to an aspect of an exemplary embodiment, there is provided a method of displaying an image in an image display apparatus, wherein the image display apparatus includes a receiver configured to receive first image data and a signal processor configured to process the received first image data to be displayed on a screen of the image display apparatus, the method including: cutting off power supplied to at least one component from among components of the image display apparatus and outputting second image data that are different from the first image data to an area of the screen, in response to a state of the image display apparatus.

The cutting off may include cutting off power supplied to the signal processor of the image display apparatus.

The cutting off the power supplied to the signal processor may include cutting off power supplied to a portion of the signal processor and supplying power to another portion of the signal processor.

The outputting may include outputting the second image data to the area of the screen by using the another portion of the signal processor.

The another portion of the signal processor may include a storage configured to store the second image data.

The method may further include storing the second image data in a storage.

The method may further include updating the second image stored in the storage in a predetermined time interval based on information received through the receiver.

The cutting off may include cutting off power supplied to the receiver in response to the state of the image display apparatus, and the cutting off may include alternately supplying and cutting off the power supplied to the receiver, and the updating is performed when the power is supplied to the receiver.

According to an aspect of an exemplary embodiment, there is provided a display apparatus including: a display panel including a plurality of areas defined by a plurality of gate lines and a plurality of data liens; a data driver configured to provide image data to a data line of the display panel among the plurality of areas of the display panel; a gate driver configured to provide a scan signal to a gate line of the display panel; and a timing controller configured to control the data driver to provide first image data externally provided to the data line of the display panel in response to a first mode of the display apparatus, and control the data driver to provide second image data stored in at least one of the data driver, the gate driver, and the timing controller to the data line of the display panel in response to a second mode of the display apparatus.

The timing controller may control the data driver to provide the second image data to be output to an area among the plurality of areas of the display panel.

The display apparatus may further include a backlight configured to provide light to the plurality of areas of the display panel, wherein the timing controller is configured to control to turn off at least one the backlight and the gate driver corresponding to another area from among the plurality of areas of the screen in which the second image data is not output.

BRIEF DESCRIPTION OF THE DRAWINGS

The above and/or other aspects will become apparent and more readily appreciated by describing certain exemplary embodiments with reference to the accompanying drawings in which:

FIG. 6 is a view illustrating a screen where second image data is output according to another exemplary embodiment;

FIG. 7 is a view illustrating a screen where second image data is output according to still another exemplary embodiment;

FIG. 9 is a view illustrating a screen where second image data is output according to still another exemplary embodiment;

FIG. 12 is a flowchart of an image display method according to an exemplary embodiment.

DETAILED DESCRIPTION

Figure 1:
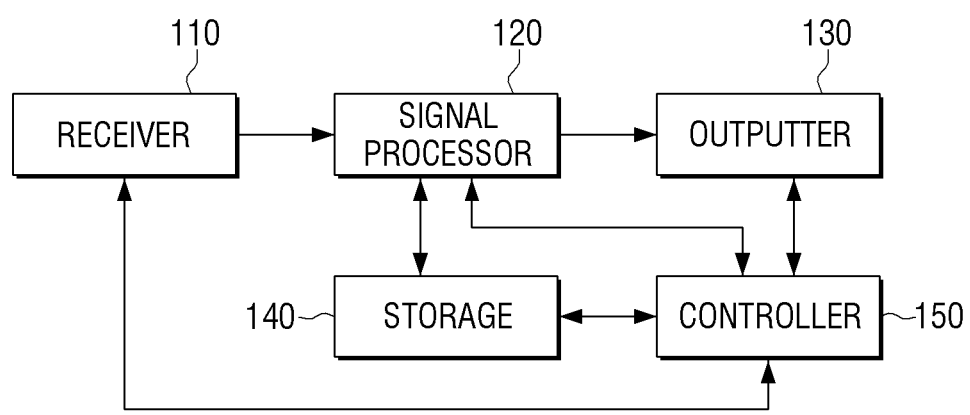
FIG. 1 is a block diagram illustrating a configuration of an image display apparatus according to an exemplary embodiment.

Certain exemplary embodiments are described in higher detail below with reference to the accompanying drawings.

In the following description, like drawing reference numerals are used for the like elements, even in different drawings. The matters defined in the description, such as detailed construction and elements, are provided to assist in a comprehensive understanding of exemplary embodiments. However, exemplary embodiments can be practiced without those specifically defined matters. Also, well-known functions or constructions are not described in detail since they would obscure the application with unnecessary detail.

FIG. 1 is a block diagram illustrating a configuration of an image display apparatus according to an exemplary embodiment.

An image display apparatus according to various exemplary embodiments may include one or more displays. The image display apparatus is an apparatus configured to execute an application, or display contents or images. The image display apparatus may be embodied as at least one of a digital television (TV), a tablet, a personal computer (PC), a portable multimedia player (PMP), a personal digital assistant (PDA), a smart phone, a cellular phone, a digital photo frame, a digital signage, and a kiosk.

Referring to FIG. 1, an image display apparatus 100-1 according to an exemplary embodiment includes a receiver 110, a signal processor 120, an outputter 130, a storage 140, and a controller 150.

The receiver 110 is a component for receiving a content (or first image data) and/or information on the content from an external apparatus. The receiver 110 may receive broadcasting program contents from a broadcasting station using a broadcasting network, or receive contents from a web server through the internet. Furthermore, the receiver 110 may receive contents from various record medium reproducing apparatuses that is provided within the image display apparatus 100-1 or connected to the image display apparatus 100-1. Herein, the record medium reproducing apparatuses refer to apparatuses for reproducing contents stored in various types of record media such as compact disks (CDs), digital versatile disks (DVDs), hard disks, blue-ray disks, memory cards, and universal serial bus (USB) memories.

In the case of receiving contents from a broadcasting station, the receiver 110 may include components such as a tuner (not illustrated) and a demodulator (not illustrated).

The tuner selects a radio frequency (RF) broadcasting signal that corresponds to a selected channel from among RF broadcasting signals that are received through an antenna, and converts the selected RF broadcasting signal into an intermediate frequency (IF) signal, a base band image, and/or a sound signal. In response to the selected RF broadcasting signal being a digital broadcasting signal, the tuner converts the selected RF broadcasting signal into a digital IF signal, and in response to the selected RF broadcasting signal being an analogue broadcasting signal, the tuner converts the selected RF broadcasting signal into an analogue base band image or sound signal (CVBS SIF). The converted signal that is output from the tuner may be input into the signal processor 120 that will be explained in detail hereinbelow. The tuner may receive an RF broadcasting signal of a single carrier according to an advanced television system committee (ATSC) method or an RF broadcasting signal of a plurality of carriers according to a digital video broadcasting (DVB) method.

The demodulator (not illustrated) receives the digital IF signal converted by the tuner and performs a demodulating operation. In response to the digital IF signal output from the tuner being a signal of the ATSC method, the demodulator performs an 8-vestigal side band (VSB) demodulation. In response to the digital IF signal output from the tuner being a signal of the DVB method, the demodulator performs a coded orthogonal frequency division modulation (COFDMA) demodulation. Furthermore, the demodulator may perform channel decoding such as trellis decoding, de-interleaving, Reed-Solomon decoding and so forth.

In the case where the demodulator performs channel decoding, a stream signal (TS) is output. The stream signal may be a signal in which an image signal, a sound signal, and/or a data signal are multiplexed. For example, the stream signal may be a motion pictures experts groups (MPEG)-2 TS where an MPEG-2 standard image signal and a Dolby Digital AC-3 standard sound signal are multiplexed. The stream signal output from the demodulator is input into the signal processor 120.

Also, the receiver 110 may receive contents from an external server such as a web server. In this case, the receiver 110 may be embodied as a network interface card (not illustrated). In this case, the image display apparatus 100-1 and the web server may comply with a transmission control protocol/internet protocol (TCP/IP) that is a standard protocol for transmitting information on the internet. The TCP is a standard for the technology of dividing transmitted data in certain units and packaging the same, and the IP is a standard for directly sending and receiving the data.

The receiver 110 may receive contents from various external apparatuses other than via the internet. To this end, the receiver 110 may include, for example, a composite video banking sync (CVBS) terminal, a component terminal, an S-video analog terminal, a digital visual interface (DVI) terminal, an high definition multimedia interface (HDMI) terminal, a mobile high-definition link (MHL) terminal, an RGB terminal, a D-subminiature (D-SUB) terminal, an IEE1394 terminal, a Sony and Philips digital interface (SPDIF) terminal, a liquid high definition (HD) terminal, and a USB terminal and the like.

The receiver 110 may include various wireless communication modules. The receiver 110 may include short-distance communication modules such as, for example, a Wifi module, a Bluetooth module, an infrared data association (IrDA) module, a near field communication (NFC) module, a Zigbee module, a radio frequency identification (RFID) module, and an ultra wideband (UWB) module. The receiver 110 may be embodied as a 3rd generation mobile communication module such as a wideband code division multiple access (WCDMA), a high speed downlink packet access (HSDPA), a high speed uplink packet access (HSUPA), a high speed packet access (HSPA), a 4th generation mobile communication module such as a bobile WiMAX, WiBro, or a 4th generation long term evolution (LTE) module.

The receiver 110 may receive contents from a set top box. The set top box may support bilateral communication to support an internet protocol (IP) TV.

The receiver 110 may include at least one of the above described components, and may receive contents from a plurality of different apparatuses. The signal processor 120 signal-processes the contents received from a respective module.

The signal processor 120 is a component for signal-processing the first image data that are received. That is, the signal processor 120 separates audio and video data from the stream signal (TS), and adjusts a picture ratio of an image in which an object is displayed. Then, the signal processor 120 removes image degradation and/or noise from the image, determines a frame rate, and adjusts the image frame. The image frame is sent to the outputter 130.

The outputter 130 outputs the signal-processed the first image data. That is, the outputter 130 receives a clock signal (DCLK), a horizontal synchronization signal (Hsync), and a vertical synchronization signal (Vsync), and generates a gate control signal (or scan control signal) and a data control signal (or data signal), re-aligns R, G, B data of the image frame, and outputs the re-aligned R, G, B data to a display panel. The configuration and operations of the outputter 130 may be explained in further detail later.

The storage 140 is a component for storing second image data. Herein, the second image data includes image data that are differentiated from the first image data. Similar to the first image data, the second image data may be at least one of a broadcasting program content received from a broadcasting station using a broadcast network, a web content received from a web server using the internet, a content stored in various record medium reproducing apparatuses that is provided within the image display apparatus 100-1 or connected to the image display apparatus 100-1, and a content received from various external apparatuses. Furthermore, the second image data may be a content generated by capturing or combining a portion of the first image data.

The storage 140 may be provided by using various technological means. For example, the storage 140 may include a memory such as a read only memory (ROM) or a random access memory (RAM), a hard disk drive (HDD), and a Blur-ray disk (BD). The memory used herein may be, but not limited to, an electrically erasable and programmable ROM (EEPROM), or a nonvolatile memory such as a nonvolatile RAM. However, volatile memories such as a static RAM or a dynamic RAM may also be used.

The controller 150 controls overall operations of the image display apparatus 100-1. The controller 150 includes a hardware configuration such as a micro processing unit (MPU) or a central processing unit (CPU), a cache memory, and a data bus, and a software configuration such as an operating system, and software for an application of a certain purpose. A control command for each component for operating the image display apparatus 100-1 is read from a memory according to a system clock, and the controller 150 generates an electric signal according to the read control command and operates each component of the hardware.

In an exemplary embodiment, in response to the image display apparatus 100-1 entering a power saving mode, the controller 150 may cut off power supplied to each component of the image display apparatus 100-1, and control the outputter 130 to output the stored second image data to an area of the screen.

The power saving mode refers to a mode in which power supplied to a portion or an entirety of the image display apparatus 100-1 is cut off to reduce the power being consumed by the image display apparatus 100-1, in response to the image display apparatus 100-1 being in a certain state. The image display apparatus 100-1 may enter a power saving mode in response to one of various states of the image display apparatus 100-1.

In an exemplary embodiment, in response to an elapse of a predetermined period of time with no first image data being input, the image display apparatus 100-1 may enter into a power saving mode. For example, the receiver 110 of the image display apparatus 100-1 may not receive a broadcasting program and the image display apparatus 100-1 may display a background screen image on a screen. Herein, further in response to a state of the image display apparatus 100-1 in which image data that are different from the broadcasting program (for example, image data according to user input) is not received for the predetermined period of time, the image display apparatus 100-1 may be controlled to enter into a power saving mode.

In another example, the image display apparatus 100-1 may enter a power saving mode, in response to a predetermined control signal being received from a remote control apparatus. In this case, the image display apparatus 100-1 may be provided with an interface for receiving a control command from the remote control apparatus. Furthermore, in response to the predetermined control signal being received through the interface (for example, a certain button on the remote control apparatus is pressed by the user), the image display apparatus 100-1 may execute a power saving mode.

In still another example, the image display apparatus 100-1 may enter a power saving mode in response to the receiver 110 continuously receiving the same image data. The user may not want to view the image content any longer, and instead want to display a certain image on the screen in an electronic picture frame format. In this case, when the user inputs the certain image into the image display apparatus 100-1 through the interface, power need not be supplied as in the case of a configuration where the image display apparatus 100-1 receives and displays the image contents, and thus the image display apparatus 100-1 may be controlled to enter into a power saving mode.

In the power saving mode, the image display apparatus 100-1 may return back to an original state, that is, to a state where power is supplied to all of the components of the image display apparatus 100-1, by using various methods. For example, in response to the image display apparatus 100-1 receiving a control command corresponding to inputting of a certain key on the remote control apparatus by the user or a control command corresponding to shaking the remote control apparatus by the user, in response to the image display apparatus receiving a new image signal, or in response to an elapse of a predetermined period of time from entering the power saving mode, the image display apparatus may return back to the original state. In another exemplary embodiment, the image display apparatus 100-1 may be embodied such that power is completely turned off in response to an elapse of the predetermined period of time from entering the power saving mode.

The power saving mode may be set up by the user input. In an exemplary embodiment, the image display apparatus according to an exemplary embodiment may display a menu or a user interface for the user to set up the power saving mode. The user may perform a user input to select whether to use the power saving mode and to select which power saving mode to use. In this case, the power saving mode of the image display apparatus 100-1 is set up according to the user input. Furthermore, a method for returning from the power saving mode back to the original state may be set up by the user. For example, it is possible to set up by a user input that, in response to an elapse of a predetermined period of time from entering the power saving mode, all the power to the image display apparatus 100-1 is turned off or the image display apparatus 100-1 returns back to the state where the image is normally displayed.

In response to the power saving mode being entered, the controller 150 may cut off the power supplied to each component of the image display apparatus 100-1, and control the outputter 130 to output the stored second image data to an area of the screen. That is, the controller 150 may cut off the power from components other than a minimum number of components that are needed for reading the second image data from the storage and displaying the second image data on the screen. For example, in the power saving mode, the power supplied to the receiver 110 and signal-processor 120 may be cut off.

Figure 2:
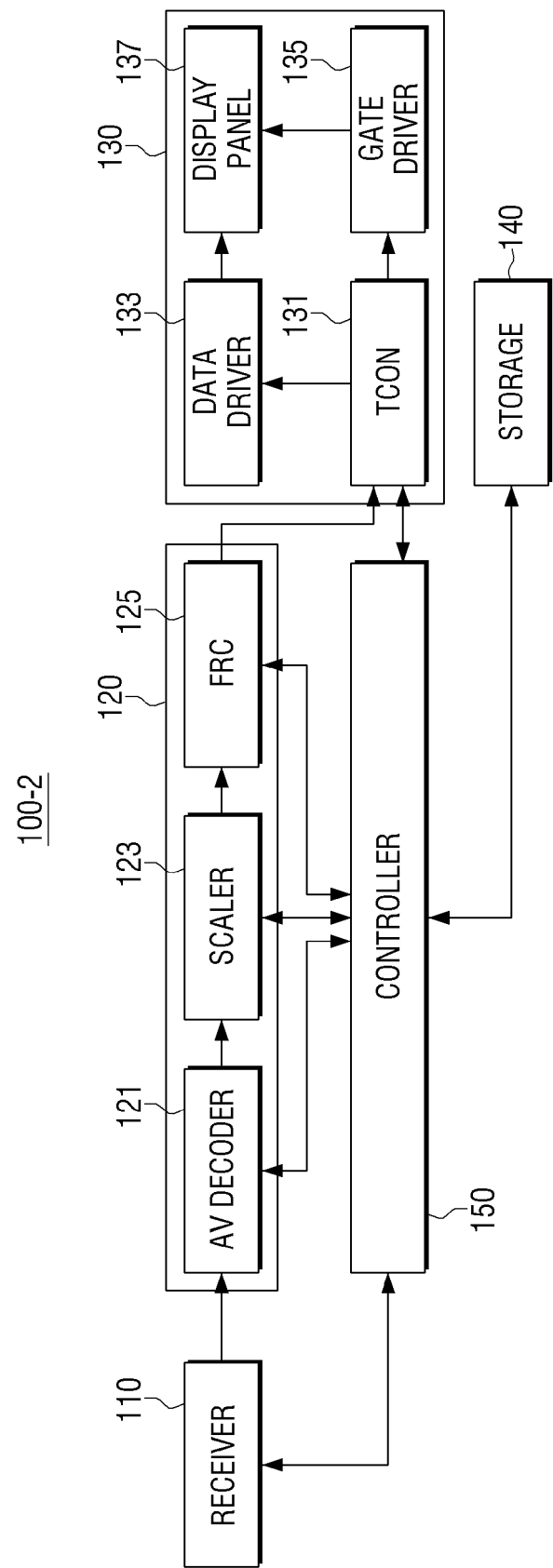
FIG. 2 is a block diagram illustrating a configuration of an image display apparatus according to another exemplary embodiment.

FIG. 2 is a block diagram illustrating a configuration of an image display apparatus 100-2 according to another exemplary embodiment.

Referring to FIG. 2, the image display apparatus 100-2 according to another exemplary embodiment includes a receiver 110, a signal-processor 120, an outputter 130, a storage 140, and a controller 150.

The receiver 110 is a component for receiving first image data, and the storage 140 is a component for storing second image data. The receiver 110 and the storage 140 are similar to the receiver 110 and the storage 140 of the exemplary embodiment of FIG. 1, and thus repeated explanation will be omitted.

The signal-processor 120 may include an audio/video (AV) decoder 121, a scaler 123, and a frame rate converter (FRC) 125.

In response to receiving a stream signal, the AV decoder 121 may de-multiplex the stream signal, and separate an image signal, a sound signal and/or a data signal from the de-multiplexed stream signal. In response to the de-multiplexed image signal being an encoded image signal, the AV decoder 121 performs decoding on the image signal. For example, an MPEG-2 standard encoded image signal may be decoded by an MPEG-2 decoder, and an H.264 standard image signal of digital multimedia broadcasting (DMB) or digital video broadcasting-handheld (DVB-H) may be decoded by an H.264 decoder.

Furthermore, the AV decoder 121 may also process a de-multiplexed sound signal. For example, an encoded sound signal of the MPEG-2 standard may be decoded by the MPEG-2 decoder, and an encoded sound signal of the MPEG 4 bit sliced arithmetic coding (BSAC) standard of a ground wave DMB may be decoded by the MPEG-4 decoder. Furthermore, an encoded sound signal of the MPEG-2 advanced audio codec (AAC) standard of the DMB method or DVB-H method may be decoded by an AAC decoder.

Furthermore, the AV decoder 121 may perform data-processing on the de-multiplexed data signal. The AV decoder 121 may decode the encoded data. The encoded data may include an electric program guide (EPG) which includes information on programs being aired on each channel. In the case of the ATSC method, the EPG may include ATSC-program and system information protocol (PSIP) information, and in the case of the DVB method, the EPG may include DVB-service information (SI) information.

The scaler 123 adjusts a picture ratio of an image frame so that the image frame is fit into a display panel. Furthermore, in response to an operating system being booted, the scaler 123 switches on each wired interface module, and sets up time information of the image display apparatus 100-2.

The FRC 125 converts a frame rate of the image frame of the first image data in accordance with a display mode of display. For example, in the case of a single view mode, the FRC 125 may adjust the frame rate of the image frame of the first image data to 60 Hz. However, in the case of a multi-view mode, the FRC 125 may change the frame rate of the image frame of the first image data to 120 Hz.

Furthermore, although not illustrated in the drawings, the signal-processor 120 may further include a video enhancer configured to remove image degradation and/or noise of the image and store the image processed by the video enhancer in a frame buffer. Furthermore, the signal-processor 120 may adjust at least one of a brightness, a contrast, a resolution, a sharpness, a black tone, a position and a size of subtitles, a master volume, an equalizer, information such as balance and amplification level per frequency band, and SRS Tru-Surround HD.

The outputter 130 may include a data driver 133, a gate driver 135, a timing controller TCON 131, and a display panel 137. The outputter 130 may further include a backlight when needed.

The timing controller 131 receives a clock signal (DCLK), a horizontal sync signal (Hsync), or a vertical sync signal (Vsync), generates a gate control signal (or scan control signal) or data control signal (or data signal), and re-aligns R, G, B data being input and supplies the re-aligned R, G, B data to the data driver 133.

With respect to the aforementioned gate control signal, the timing controller 131 may generate a gate shift clock (GSC), a gate output enable (GOE), a gate start pulse (GSP) and so forth. The GSC is a signal that determines a time when a thin film transistor (TFT) connected to an emitting device such as an R, G, B organic light emitting diode (OLED) is turned on/off. The GOE is a signal for controlling an output of the gate driver 135, and the GSP is a signal that notifies a first driving line of the screen corresponding to one vertical sync signal.

Furthermore, with respect to the data control signal, the timing controller 131 may generate a source sampling clock (SSC), a source output enable (SOE), and a source start pulse (SSP). The SSC is used as a sampling clock for latching data in the data driver 133, and determines a driving frequency of a data driver integrated circuit (IC). The SOE is a signal for transmitting the data latched by the SSC to the display panel 137. The SSP is a signal for notifying a start of data latching or sampling during one horizontal sync period.

The gate driver 135 is a component for generating a scan signal, and is connected to the display panel 137 through a scan line. The gate driver 135 applies gate on/off voltages (Vgh/Vgl) provided from a voltage driver (not illustrated) according to the gate control signal generated by the timing controller 131 to the display panel 137. A gate on voltage (Vgh) is successively provided to the display panel 137, starting from a gate line 1 (GL1) to a gate line N (GLn) to provide a unit frame image.

The data driver 133 is a component for generating a data signal, and is connected to the display panel 137 through a data line. The data driver 33 completes scaling according to the data control signal generated by the timing controller 131, and inputs the RGB data of the image frame into the display panel 137. The data driver 133 converts the image data of the RGB in serial provided from the timing controller 131 into data in parallel, converts the digital data into an analogue voltage, and provides image data corresponding to one horizontal line to the display panel 137. This process is performed successively per horizontal line.

Although not illustrated in the drawings, the outputter 130 further includes a voltage driver (not illustrated), and the voltage driver generates and transmits a driving voltage for each of the gate driver 135, the data driver 133, and the display panel 137. That is, the voltage driver may generate and transmit a power voltage (VDD) needed for the display panel 137, or provide a ground voltage (VSS). Furthermore, the voltage driver may generate and provide a gate on voltage (Vgh) to the gate driver 135. To this end, the voltage driver may include a plurality of voltage driver modules (not illustrate) that operate individually.

The display panel 137 may include a plurality of gate lines (GL1~GLn) and a plurality of data lines (DL1~DLn) that intersect one another and define a pixel domain, and on the intersecting pixel domains, R, G, B light emitting diodes such as OLED may be formed. Furthermore, on one area of the pixel domain, for example, on one corner area of the pixel domain, a switching device, that is a TFT is formed. During a turn-on operation of a TFT, a gradation voltage is provided to each of the R, G, B light emitting diodes from the data driver 133. Herein, the R, G, B light emitting devices provide light in accordance to the amount of current provided based on the gradation voltage. That is, when a large amount of current is provided, the R, G, B light emitting diodes provide a corresponding amount of light.

In the abovementioned embodiment, it is described that the outputter 130 includes the OLED, but the outputter 130 may be embodied as one of various display technologies such as, for example, a liquid crystal display (LCD) panel, a plasma display panel (PDP), a vacuum fluorescent display (VFD), a field emission display (FED), and an electro luminescence display (ELD).

As aforementioned, in response to the image display apparatus 100-2 entering a power saving mode, the controller 150 cuts off the power that is provided to each component of the image display apparatus 100-2, and controls the outputter 130 to output the stored second image data to an area of the screen. Herein, the storage 140 may be a memory that may be exclusively used by each component of the signal-processor 120 or each component of the outputter 130. For example, the storage 140 may include a memory that is exclusively used by the FRC 125 and/or a memory that is exclusively used by the timing controller 131. This will be explained below.

Figure 3:
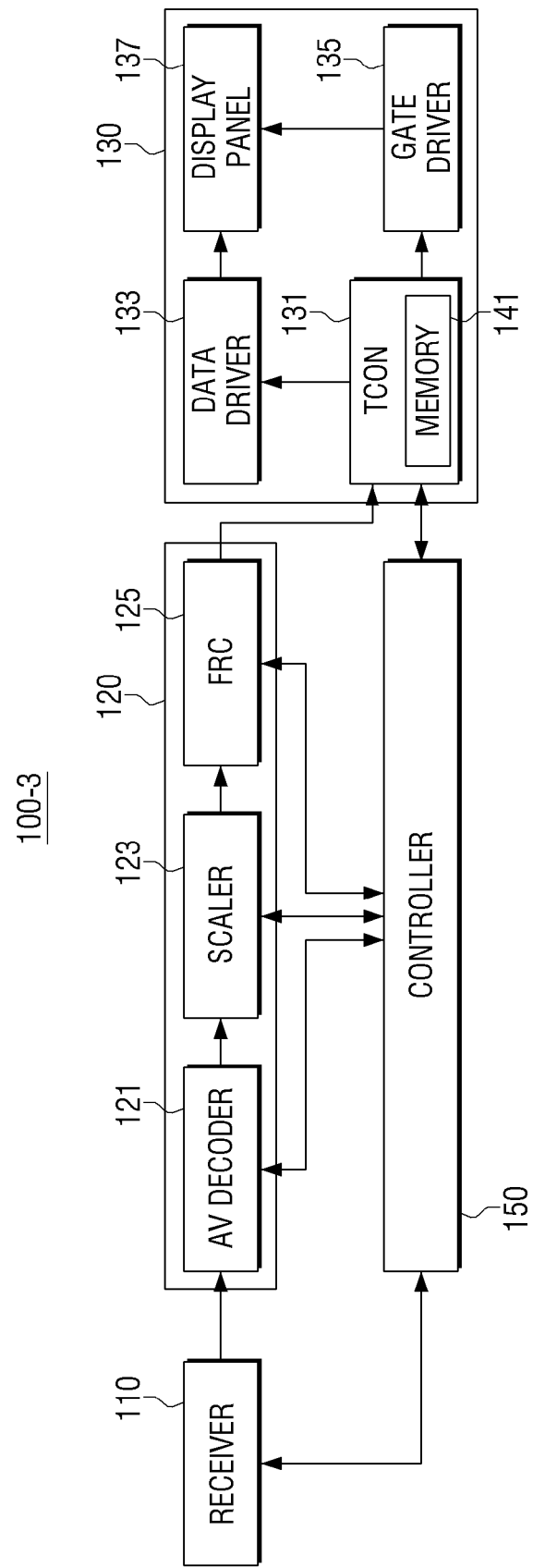
FIG. 3 is a block diagram illustrating a configuration of an image display apparatus according to still another exemplary embodiment.

FIG. 3 is a block diagram illustrating a configuration of an image display apparatus 100-3 according to still another exemplary embodiment.

Referring to FIG. 3, the image display apparatus 100-3 according to another exemplary embodiment includes a receiver 110, a signal processor 120, an outputter 130, and a controller 150. These components are similar to the above described corresponding components, and thus explanation on the same configurations will be omitted.

According to an exemplary embodiment, as illustrated in FIG. 3, the timing controller TCON 131 includes a memory 141. In response to the image display apparatus 100-3 entering a power saving mode, the controller 150 cuts off the power supplied to each component of the image display apparatus 100-3, and controls the outputter 130 to output second image data stored in the memory 141 to an area of the screen. Specifically, the controller 150 cuts off the power supplied to the receiver 110, the AV decoder 121, the scaler 123, and the FRC 125, and controls each component of the outputter 130 to output the second image data stored in the memory 141 on the screen.

According to an exemplary embodiment, in a power saving mode, unnecessary power is not supplied to each component of the signal-processor 120, and thus it is possible to substantially reduce power consumption.

Figure 4:
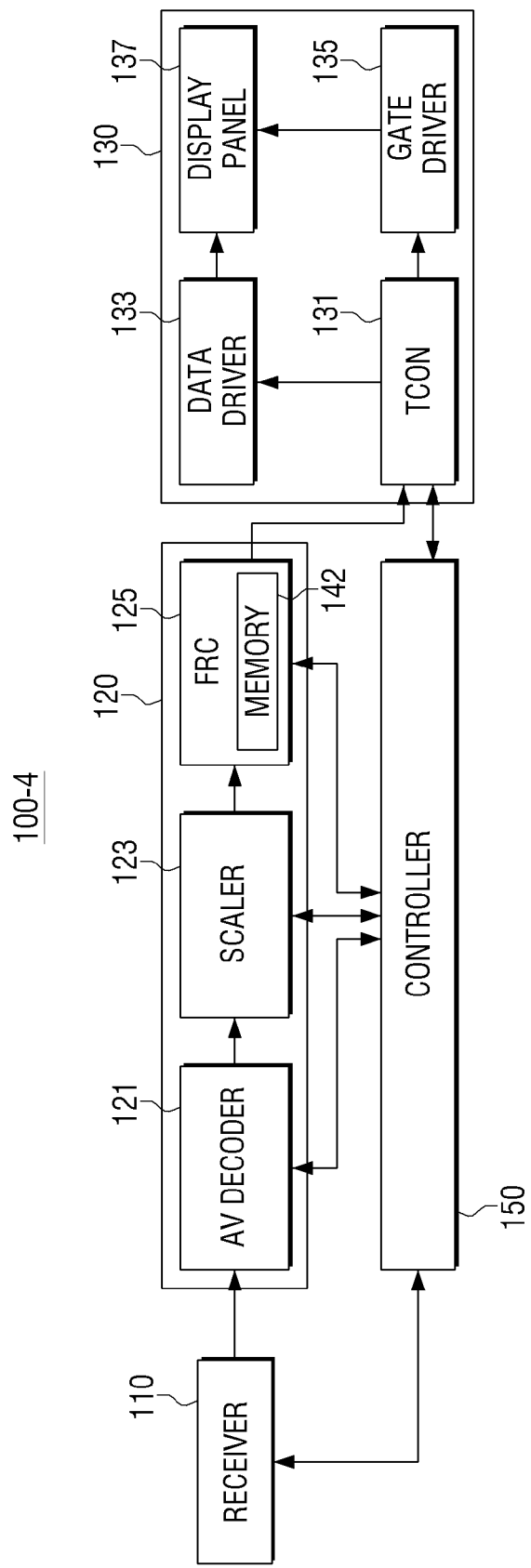
FIG. 4 is a block diagram illustrating a configuration of an image display apparatus according to still another exemplary embodiment.

FIG. 4 is a block diagram illustrating a configuration of an image display apparatus 100-4 according to still another exemplary embodiment.

Referring to FIG. 4, the image display apparatus 100-4 according to still another exemplary embodiment includes a receiver 110, a signal processor 120, an outputter 130, and a controller 150. These components are similar to the above described corresponding components, and thus explanation on the same configurations will be omitted.

According to an exemplary embodiment, as illustrated in FIG. 4, the FRC 125 includes a memory 142. In response to the image display apparatus 100-4 entering a power saving mode, the controller 150 cuts off power supplied to each component of the image display apparatus 100-4, and controls the outputter 130 to output second image data stored in the memory 142 to an area of the screen. Specifically, the controller 150 cuts off power supplied to the receiver 110, the AV decoder 121, and the scaler 123, and controls each component of the FRC 125 and the outputter 130 to display the second image data stored in the memory 142 on the screen.

According to an exemplary embodiment, in a power saving mode, unnecessary power is not supplied to each component of the signal-processor 120, and thus it is possible to substantially reduce power consumption.

Furthermore, in response to the image display apparatus 100-4 entering a power saving mode, the controller 150 cuts off power supplied to an input end of the signal-processor 120, and may control the outputter 130 to output the stored second image data to an area of the screen. For example, the controller 150 may cut off power supply to only some of the logic configurations of the FRC 125 of the signal-processor 120 in the power saving mode. In this case, the controller 150 controls such that the second image data may be stored in the memory 142 of the FRC 125, and that the outputter 130 reads and displays the second image data stored in the memory 142 of the FRC 125.

Furthermore, in another exemplary embodiment, in response to the image display apparatus 100-4 entering a power saving mode, the controller 150 may cut off power supplied to all of the components other than a flash memory and a double data rate (DDR) memory of the image display apparatus 100-4, and may control the outputter 130 to read second image data stored in the flash memory or DDR memory and display the same on an area of the screen.

Furthermore, in another exemplary embodiment, in response to the image display apparatus (not illustrated) entering a power saving mode, the controller 150 may cut off power supplied to all of the components of the image display apparatus 100-4 other than at least one component that are positioned following the timing controller 131 illustrated in FIGS. 3 and 4 with respect to an order of flow of signals, and may control the outputter 130 to read second image data stored in a memory of the at least one component and display the same on an area of the screen. Herein, the at least one component may be, for example, the data driver 133 or the gate driver 135.

Furthermore, unlike in the above embodiment, in another exemplary embodiment, in a power saving mode, a driver IC may read second image data from a memory embedded inside the driver IC and output the same to an area of the screen, in which case even power supplied to the controller 150 may also be cut off.

Furthermore, in another exemplary embodiment, in response to the image display apparatus entering a power saving mode, the controller 150 of the image display apparatus may cut off power supplied to all of the components of the image display apparatus other than a driver IC and also cut off power supplied to a portion of circuits of the driver IC, and may control such that second image data is read from a memory embedded inside the driver IC and displayed on an area of a screen while power is supplied only to a rest portion of the circuits of the driver IC. Here, the portion of circuits of the driver IC may be analogue circuits, and the rest portion of the circuits may be digital circuits. The digital circuits may receive digital protocol signals and data signals, and the image display apparatus may be configured such that the power saving mode is terminated in response to receiving a wakeup signal through the digital protocol signal in the power saving mode.

Furthermore, as will be explained below, it is also possible to turn on the driver IC corresponding to only one area of the screen, in which case power supplied to a portion of circuits of the driver IC may be cut off while power is supplied to the rest portion of the circuits.

Figure 5:
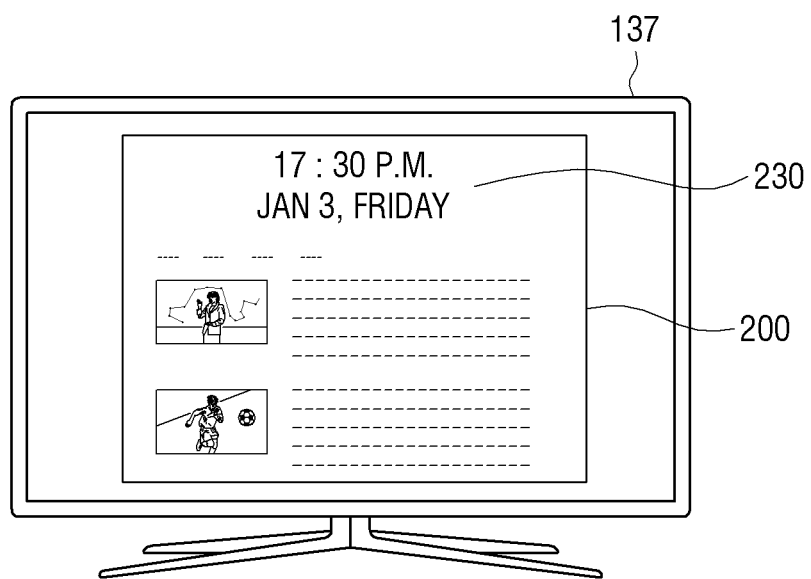
FIG. 5 is a view illustrating a screen where second image data is output according to an exemplary embodiment.
Figure 8A:
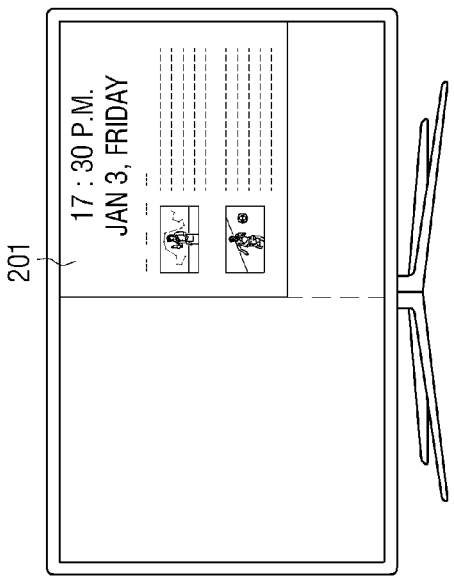
FIGS. 8A, 8B, 8C, and 8D are views illustrating a screen where second image data is output according to still another exemplary embodiment.
Figure 8B:
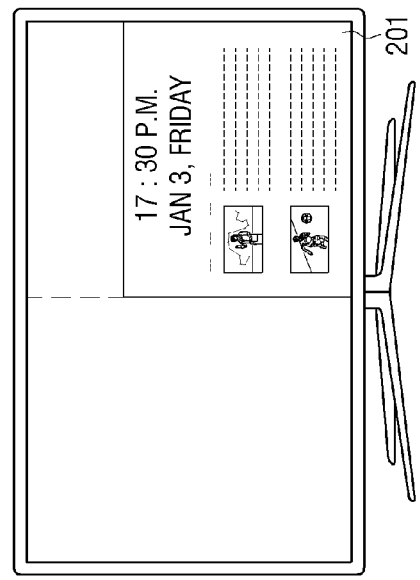
Figure 8C:
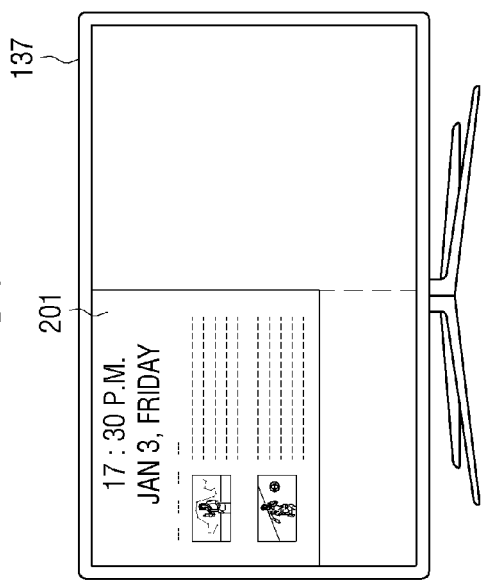
Figure 8D:
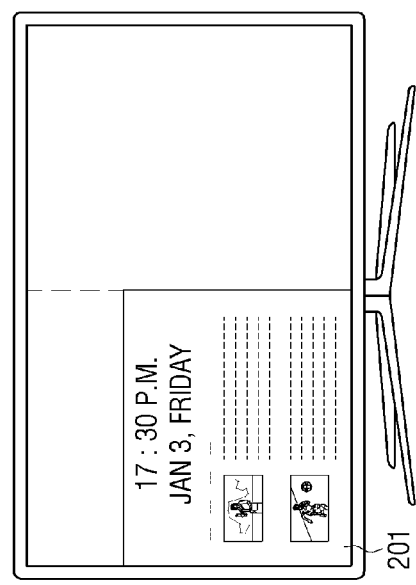

FIG. 5 is a view illustrating a screen where second image data is output according to an exemplary embodiment.

In the aforementioned exemplary embodiments, the controller 150 controls the outputter 130 to read second image data from the storage 140 and display the same on a screen. For example, the second image data may be a screen saver image 200 that includes information (or time information) 230 on a date and time as illustrated in FIG. 5.

Herein, the time information 230 needs to be updated in real time to show exact time information. However, generally, time information 230 is managed at a front end of the signal processor 120 (for example, the scaler 123), and thus there needs to be consideration for updating the time information 230 when power supply to a portion of components of the signal processor 120 is cut off.

FIG. 6 is a view illustrating a screen where second image data is output according to another exemplary embodiment.

The second image data according to another exemplary embodiment may include a plurality of sub image data. Herein, the controller 150 may control the outputter 130 to output each of the plurality of sub image data independently from one another to an area of the screen. According to an exemplary embodiment in which the second image data includes time information, the second image data may include a plurality of sub image data for changing the time information in a predetermined time interval. For example, as illustrated in FIG. 6, the second image data may include first sub image data 201 including time information 230 "17:30 P.M. Jan 3, Friday," second sub image data 202 including time information 230 "17:31 P.M. Jan 3, Friday," third sub image data 203 including time information 230 "17:32 P.M. Jan 3, Friday," and fourth sub image data 204 including time information 230 "17:33 P.M. Jan 3, Friday."

The controller 150 may show the exact time information 230 by controlling the outputter 130 to read each image data from the storage 140 in an interval of, for example, one minute. In the exemplary embodiment of FIG. 6, four sub image data are described as being included in the second image data, but it is possible to pre-store five or more sub image data. In an exemplary embodiment, since a limited number of sub image data may be pre-stored, after a certain period of time, the controller 150 supplies power to the components to which power supply has been cut off to receive time information 230, and updates new second image data based on the received time information 230 and stores the same.

The controller 150 may control such that the second image data is displayed on an entirety of the screen, or alternatively, the controller 150 may control such that the second image is displayed on only one area of the screen as illustrated in FIG. 7.

FIG. 7 is a view illustrating a screen where second image data is output according to still another exemplary embodiment.

Referring to FIG. 7, second image data according to another exemplary embodiment may be displayed on only one area of the screen. For example, no other content may be displayed on other areas of the screen. In such a case, the controller 150 may control the ouputter 130 to turn off at least one of a backlight and the gate driver 135 corresponding to an area of the screen where no content is displayed. Alternatively, the controller 150 may control the outputter 130 to turn off at least one of the backlight and the gate driver corresponding to one area of the screen in which the stored second image is output. For example, the second image data may be output to all areas of the screen, but at least one of the backlight and the gate driver may be turned off for only a portion of the all areas of the screen.

Furthermore, the controller 150 may control the outputter 130 to output the stored second image data on a plurality of areas of the screen in a predetermined time interval, which is described below.

FIGS. 8A, 8B, 8C, and 8D are views illustrating a screen where second image data according to still another exemplary embodiment is being output.

Referring to FIGS. 8A-8D, the controller 150 may control the outputter 130 to sequentially output the second image data stored in a predetermined time interval on a left top area, a right top area, a left bottom area, and a right bottom area of the screen. Herein, the controller 150 may control such that at least one of the backlight, the gate driver 135, and the data driver 133 corresponding to an area where the stored second image data is not displayed is turned off. Similar to the aforementioned exemplary embodiment of FIG. 7, the second image data may include a plurality of sub image data, which will be described in FIG. 9 below.

According to an exemplary embodiment, by sequentially displaying the second image data on a plurality of areas on the screen in a certain time interval, it is possible to remove an afterimage of the screen or prevent degradation of screen quality.

FIG. 9 is a view illustrating a screen where second image data is output according to still another exemplary embodiment.

Referring to FIG. 9, the controller 150 may control the outputter 130 to sequentially output, in a predetermined time interval, first sub image data 201 on a left top area of the screen, second sub image data 202 on a right tope area, third sub image data 203 on a left bottom area, and fourth sub image data 204 on a right bottom area. Herein, the controller 150 may control such that at least one of the backlight, the gate driver 135 and the data driver 133 corresponding to an area where any one of the sub image data 201 to 204 is not displayed is turned off while one of the stored sub image data 201 to 204 is displayed.

To update the second image data, the controller 150 may re-supply or cut off power to or from each component of the image display apparatuses 100-1, 100-2, 100-3, 100-4 according to the exemplary embodiments in a predetermined time interval, and update the second image data stored in the storage 140. That is, to update time information, the controller 150 may supply power to a component that manages time in the image display apparatuses 100-1, 100-2, 100-3, 100-4, or supply power to the receiver 110 in a predetermined time interval, thereby receiving new second image data and updating the second image data stored in the storage 140. In response to the update of the second image data being completed, power to a corresponding component, e.g., the component that manages time or the receiver 110 may be cut off again. The above operation may be periodically performed according to a predetermined time interval.

The image display apparatuses 100-1, 100-2, 100-3, 100-4 according to various embodiments have an effect of reducing an operating system (O/S) booting time of the system, as described below.

Figure 10A:
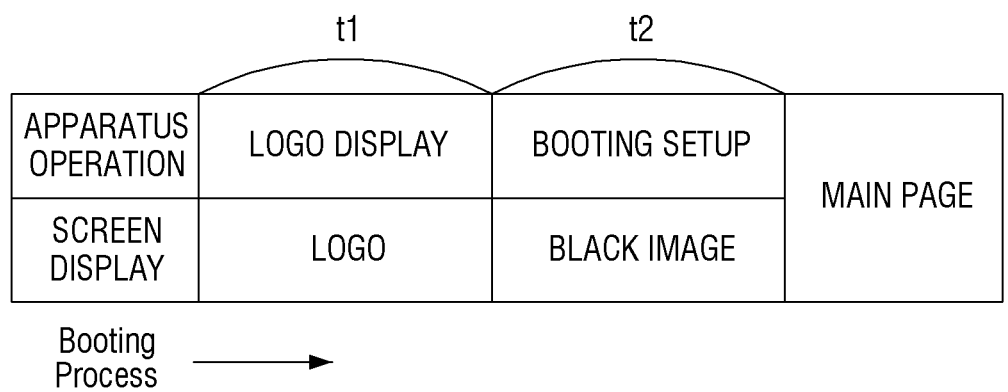
FIGS. 10A and 10B are views illustrating a booting time of an image display apparatus according to an exemplary embodiment.
Figure 10B:
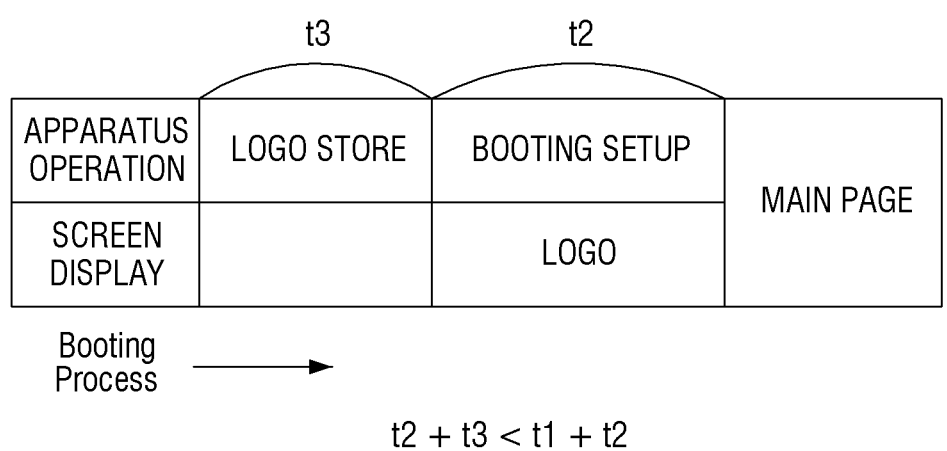

FIGS. 10A and 10B are views illustrating a booting time of an image display apparatus according to an exemplary embodiment.

The controller 150 of the image display apparatuses 100-1, 100-2, 100-3, 100-4 according to various exemplary embodiments store second image data first before a booting is completed, in response to the image display apparatuses 100-1, 100-2, 100-3, 100-4 being turned on. Furthermore, the controller controls the outputter 130 to output the stored second image data to an area of the screen.

Referring to FIG. 10A, a related art image display apparatus first performs an operation of displaying a logo in response to the image display apparatus being turned on. The related art image display apparatus receives the logo, and performs an appropriate signal-processing, and the outputter outputs the same. Furthermore, when the displaying of the logo is stopped, the image processor starts the booting. While the booting is being performed, no image is displayed on the screen.

On the other hand, according to the exemplary embodiments, in response to the image display apparatuses 100-1, 100-2, 100-3, 100-4 being turned on, the image display apparatuses 100-1, 100-2, 100-3, 100-4 first store second image data corresponding to the logo to the storage 140 before the booting is performed. Furthermore, while the signal processor 120 proceeds with the booting, the image display apparatuses 100-1, 100-2, 100-3, 100-4 read the second image data from the storage 140 and continuously display the same. Therefore, since the signal processor 120 does not operate to display the logo immediately after storing the second image data corresponding to the logo, it is possible to reduce the booting time. Furthermore, since the logo image is displayed instead of a black image while the booting is being processed, user convenience is improved.

Assuming that the time needed for displaying the logo in a related art image display apparatus is t1, the time needed for the booting is t2, and the time needed to store the logo image is t3, the time needed for a final main page to be displayed after the related art image display apparatus is turned on may be t1+t2, and the time needed for the final main page to be displayed after the image display apparatuses 100-1, 100-2, 100-3, 100-4 according to the exemplary embodiments are turned on may be t2+t3. Here, a time period corresponding to t2+t3 is less than a time period corresponding to t1+t2. That is, the image display apparatus 100-1, 100-2, 100-3, 100-4 according to the exemplary embodiments may reduce the booting time.

Furthermore, the image display apparatuses 100-1, 100-2, 100-3, 100-4 according to the exemplary embodiments have an advantage of displaying a logo image or second image data that are desired by the user on the screen not only during booting but also when converting an image mode or a frame rate.

That is, the controller 150 may store the second image data to the storage 140 before a conversion of a frame rate or a mode between a 2D image mode and a 3D image mode is performed on the image display apparatuses 100-1, 100-2, 100-3, 100-4, and in response to the frame rate conversion or the mode conversion, the controller 150 may control the outputter 130 to output the stored second image data to one area of the screen during the frame rate conversion or the mode conversion. Since it is possible to display the second image data that are desired by the user on the screen even in the case of a mode conversion or frame rate conversion, it is possible to remove an unnatural screen display during the mode conversion or frame rate conversion.

Furthermore, in response to the image display apparatuses 100-1, 100-2, 100-3, 100-4 entering a power saving mode, the controller 150 may control at least one of the signal processor 120 and the outputter 130 to adjust at least one of a gamma voltage, a display driving voltage, a frame rate, a backlight emitting time, a clock, and a resolution.

Figure 11:
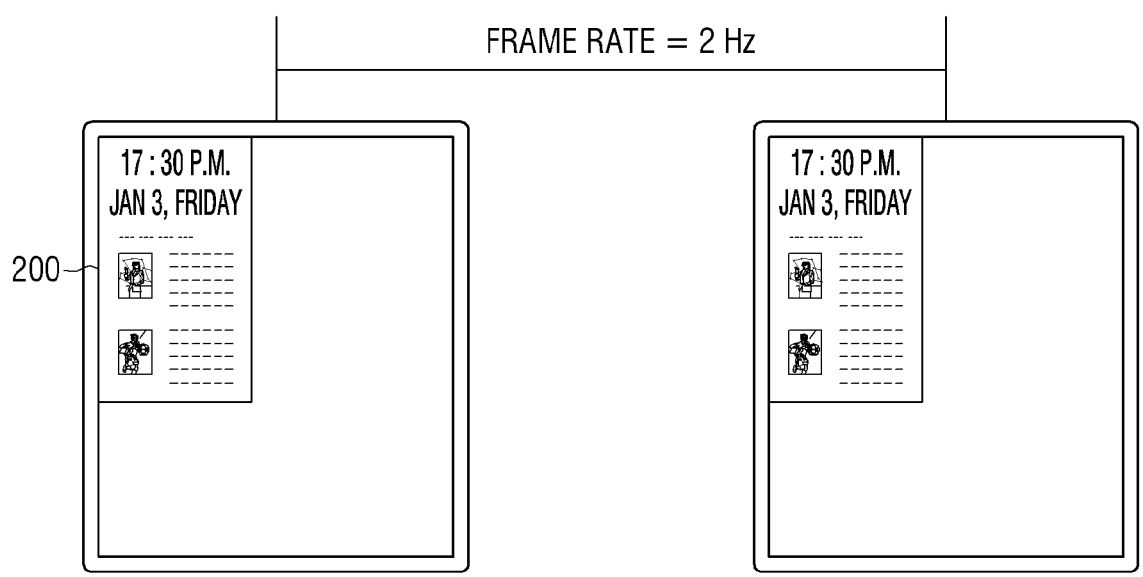
FIG. 11 is a view illustrating adjusting a frame rate and outputting second image data according to an exemplary embodiment.

For example, the controller 150 may control to adjust the frame rate of the image display apparatuses 100-1, 100-2, 100-3, 100-4, as described below. FIG. 11 is a view illustrating adjusting a frame rate and outputting second image data according to an exemplary embodiment.

As illustrated in FIG. 11, the controller 150 may substantially reduce the frame rate of the image display apparatuses 100-1, 100-2, 100-3, 100-4 and thus save power consumption thereof. For example, the controller 150 may control the outputter 130 to reduce the frame rate of 60 Hz to 2 Hz and display the second image data.

Furthermore, the controller 150 may adjust a driving voltage such as power voltage AVDD or gate on/off voltages Vgh, Vgl to a certain ratio, and reduce power consumption. For example, the controller 150 may reduce the AVDD by about 20%, and reduce the Vgh by about 20%, and turn off a kick back signal.

Furthermore, in the case of a gamma voltage, the controller 150 may reduce a difference between a minimum value and a maximum value of the gamma voltage, or turn off the gamma voltage corresponding to a grey area while turning on only the gamma voltage corresponding to black or white.

Furthermore, the controller 150 may control at least one of the signal processor 120 and the outputter 130 to control at least one of the gamma voltage, the display driving voltage, the backlight light emitting time, the data signal, the gate signal, and the resolution in a blank section where the second image data is not output according to adjustment of the frame rate.

As described above, according to various exemplary embodiments, it is possible to not only save power per area of the screen, but also save power per image display time.

Additionally, it is possible to adjust dimming of the backlight and increase a driving cycle of the backlight, thereby reducing power consumption.

The image display apparatuses 100-1, 100-2, 100-3, 100-4 according to various exemplary embodiments may further include a sensor (not illustrated) for sensing a viewer.

The sensor may sense existence and/or absence of a viewer or movement of the viewer. To this end, the sensor may include at least one of a deterioration sensor, a movement sensor, and an image sensor.

In an exemplary embodiment, the controller 150 may store second image data differently depending on the sensed viewer. For example, the controller 150 may control such that corresponding second image data is displayed according to age, gender, and/or age information of the viewer or according to whether the viewer is a registered viewer. Furthermore, upon identifying a viewer by face recognition, the controller 150 may display second image data based on preference information of the viewer (for example, preferred contents or image of the viewer).

Hereinafter, an image display method according to various exemplary embodiments will be explained.

FIG. 12 is a flowchart of an image display method according to an exemplary embodiment.

Referring to FIG. 12, the image display method according to an exemplary embodiment includes receiving first image data (S1210), signal-processing the received first image data (S1220), outputting the signal-processed first image data (S1230), storing second image data (S1240), and in response to the image display apparatus entering a power saving mode (S1250—Y), cutting off power supplied to each component of the image display apparatus and outputting the stored second image data to an area of the screen (S1260).

Herein, the outputting the second image data to an area of the screen in operation S1260 may include cutting off power supplied to the signal-processor and outputting the stored second image data to an area of the screen in response to the image display apparatus entering the power saving mode.

Furthermore, the outputting the second image data to an area of the screen may include cutting off power supplied to at least one of the receiver, the A/V decoder, the scaler, and the video enhancer in response to the image display apparatus entering a power saving mode.

Furthermore, the storage may be a memory embedded in the frame rate converter or a memory embedded in the timing controller.

In an exemplary embodiment, in response to an elapse of a predetermined period of time during which no input of the first image data is received, the image display apparatus may enter the power saving mode.

Furthermore, in response to a predetermined control signal being received from a remote control apparatus, the image display apparatus may enter a power saving mode.

Furthermore, in response to the receiver continuously receiving the same image data, the image display apparatus may enter a power saving mode.

Furthermore, the outputting the second image data on one area of the screen in operation S1260 may include outputting the stored second image data on a plurality of areas of the screen by a predetermined time interval.

Furthermore, the outputting the second image data to an area of the screen in operation S1260 may include controlling such that at least one of the backlight, the gate driver 135, and the data driver 133 corresponding to an area where the stored second image data is not displayed is turned off.

Furthermore, the second image data may include a plurality of image data, and the outputting the second image data to an area of the screen in operation S1260 may include outputting each of the plurality of image data independently on the one area of the screen.

Herein, the plurality of image data may each include time information different from one another.

Furthermore, the outputting the second image data to an area of the screen may include supplying or cutting off power to or from each component of the image display apparatus in a predetermined time interval and updating the second image data.

Furthermore, the image display method may further include storing the second image data in the storage before a booting is performed and outputting the stored second image data to one area of the screen, in response to the image display apparatus being turned on.

Furthermore, the image display method may further include storing the second image data in the storage before the frame rate conversion or mode conversion, and outputting the stored second image data to an area of the screen, in response to a conversion of a frame rate of the image display apparatus or a mode conversion between a 2D image mode and a 3D image mode.

Furthermore, the image display method may further include adjusting at least one of the gamma voltage, the display driving voltage, the frame rate, backlight driving time, clock, and resolution in response to the image display apparatus entering the power saving mode.

Herein, it is possible to adjust at least one of the gamma voltage, the display driving voltage, the frame rate, the backlight light emitting time, and the resolution in a blank section of the clock signal in the power saving mode.

Furthermore, the image display method may further include sensing a viewer, and storing the second image data differently according to the sensed viewer.

The image display methods according to the exemplary embodiments may be stored in a program format in a computer readable non-transitory record medium. Herein, the computer readable non-transitory record medium refers to not a medium where data may be stored for a short period of time such as a register and a cache, but a medium where data may be stored semi-permanently and which may be read by an electronic apparatus, for example, a CD, a DVD, a hard disk, a blue-ray disk, a USB, a memory card, and a ROM.

Furthermore, the image display method according to the exemplary embodiments may be embedded inside a hardware IC chip in an embedded software format, or may be included as a component of the image display apparatus 100 as described above.

Although a few exemplary embodiments have been shown and described, it would be appreciated by those skilled in the art that various changes may be made without departing from the principles and spirit of the disclosure, the scope of which is defined in the claims and their equivalents.

What is claimed is:

1. An image display apparatus comprising:
   a receiver configured to receive first image data;
   a signal processor configured to process the received first image data;
   an outputter configured to output the processed first image data;
   a storage configured to store second image data; and
   a controller configured to cut off power supplied to at least one component from among components of the image display apparatus and to control the outputter to output the stored second image data to an area of a screen, in response to the image display apparatus entering a power saving mode,
   wherein the outputter comprises a timing controller, and the signal processor comprises at least one from among an audio/video (A/V) decoder, a scaler, a frame rate converter, and a video enhancer.

2. The apparatus according to claim 1, wherein the controller is configured to cut off power supplied to the signal processor and control the outputter to output the stored second image data to the area of the screen, in response to the image display apparatus entering the power saving mode.

3. The apparatus according to claim 1, wherein the controller is configured to cut off power supplied to at least one from among the receiver, the A/V decoder, the scaler, and the video enhancer, in response to the image display apparatus entering the power saving mode.

4. The apparatus according to claim 1, wherein the storage comprises a memory included in the frame rate converter.

5. The apparatus according to claim 1, wherein the storage comprises a memory included in the timing controller.

6. The apparatus according to claim 1, wherein the image display apparatus is configured to enter the power saving mode, in response to an elapse of a predetermined period of time during which the first image data are not received.

7. The apparatus according to claim 1, wherein the image display apparatus is configured to enter the power saving mode in response to receiving a predetermined control signal from a remote control apparatus.

8. The apparatus according to claim 1, wherein the image display apparatus is configured to enter the power saving mode in response to the receiver continuously receiving the same image data.

9. The apparatus according to claim 1, wherein the controller is configured to control the outputter to output the stored second image data to at least one area from among a plurality of areas of the screen in a predetermined time interval.

10. The apparatus according to claim 9, wherein the controller is configured to control the outputter to turn off at least one of a backlight and a gate driver corresponding to at least one of an area of the screen in which a data driver of the outputter outputs the stored second image data and another area of the screen in which the data driver does not output the stored second image data.

11. The apparatus according to claim 1, wherein:
the second image data comprises a plurality of image data; and
the controller is configured to control the outputter to independently output each of the plurality of image data to the area of the screen.

12. The apparatus according to claim 11, wherein the plurality of image data comprise time information that is different from one another.

13. The apparatus according to claim 1, wherein the controller is configured to supply or cut off power to or from the at least one component of the image display apparatus in a predetermined time interval, and to update the second image data stored in the storage when the power is supplied to the at least one component of the image display apparatus, in response to the image display apparatus entering the power saving mode.

14. The apparatus according to claim 1, wherein the controller is configured to, in response to a conversion of a frame rate or a mode conversion between a two dimensional (2D) image mode and a three dimensional (3D) image mode of the image display apparatus, control the outputter to output the stored second image data to the area of the screen.

15. The apparatus according to claim 1, wherein the controller is configured to cut off power supplied to an input end of the signal processor, and control the outputter to output the stored second image data to the area of the screen, in response to the image display apparatus entering the power saving mode.

16. The apparatus according to claim 1, wherein the controller is configured to control at least one of the signal processor and the outputter to adjust at least one of a gamma voltage, a display driving voltage, a frame rate, a backlight light emitting time, a clock, and a resolution, in response to the image display apparatus entering the power saving mode.

17. The apparatus according to claim 16, wherein the controller is configured to, in response to the image display apparatus entering the power saving mode, control the at least one of the signal processor and the outputter to adjust the at least one of the gamma voltage, the frame rate, the backlight light emitting time, the clock, and the resolution in a blank section in which the second image data are not output according to adjustment of the frame rate.

18. The apparatus according to claim 1, further comprising:
a sensor configured to sense a presence of a viewer,
wherein the controller is configured to control the outputter to output the second image data that are different according to a result of sensing of the sensor.

19. An image display apparatus comprising:
a receiver configured to receive first image data;
a signal processor configured to process the received first image data;
an outputter configured to output the processed first image data;
a storage configured to store second image data; and
a controller configured to cut off power supplied to at least one component from among components of the image display apparatus and to control the outputter to output the stored second image data to an area of a screen, in response to the image display apparatus entering a power saving mode,
wherein the outputter comprises a timing controller, and
wherein the controller is configured to control such that the second image data are stored in the storage before a booting of the image display apparatus is performed, and control the outputter to output the stored second image data to the area of the screen, in response to the image display apparatus being turned on.

20. A method of displaying an image in an image display apparatus, wherein the image display apparatus comprises a receiver configured to receive first image data and a signal processor configured to process the received first image data to be displayed on a screen of the image display apparatus, the method comprising:
cutting off power supplied to at least one component from among components of the image display apparatus and outputting second image data that are stored in a storage and different from the first image data to an area of the screen, in response to a state of the image display apparatus,
wherein the second image data is stored in the storage before a booting of the image display apparatus is performed, and
wherein the outputting the second image data to the area of the screen is performed in response to the image display apparatus being turned on.

21. The method according to claim 20, wherein the cutting off comprises cutting off power supplied to the signal processor of the image display apparatus.

22. The method according to claim 21, wherein the cutting off the power supplied to the signal processor comprises cutting off power supplied to a portion of the signal processor and supplying power to another portion of the signal processor.

23. The method according to claim 22, wherein the outputting the second image data comprises outputting the second image data to the area of the screen by using the another portion of the signal processor.

24. The method according to claim 22, wherein the another portion of the signal processor comprises the storage configured to store the second image data.

25. The method according to claim 20, further comprising:
updating the second image data stored in the storage in a predetermined time interval based on information received through the receiver.

26. The method according to claim 25, wherein:
the cutting off comprises cutting off power supplied to the receiver in response to the state of the image display apparatus; and
the cutting off in response to the state of the image display apparatus comprises alternately supplying and cutting off the power supplied to the receiver, and the updating is performed when the power is supplied to the receiver.

27. A display apparatus comprising:
a display panel comprising a plurality of areas defined by a plurality of gate lines and a plurality of data lines;
a data driver configured to provide image data to a data line of the display panel;
a gate driver configured to provide a scan signal to a gate line of the display panel; and
a timing controller configured to control the data driver to provide first image data externally provided to the data line of the display panel in response to a first mode of the display apparatus, and control the data driver to provide second image data stored in at least one of the data driver, the gate driver, and the timing controller to the data line of the display panel in response to a second mode of the display apparatus, wherein the second image data is stored in the at least one of the data driver, the gate driver, and the timing controller before a booting of the display apparatus is performed.

28. The display apparatus according to claim 27, wherein the timing controller is configured to control the data driver to provide the second image data to be output to an area among the plurality of areas of the display panel.

29. The display apparatus according to claim 28, further comprising:
   a backlight configured to provide light to the plurality of areas of the display panel,
   wherein the timing controller is configured to control to turn off at least one the backlight and the gate driver corresponding to another area from among the plurality of areas of the display panel in which the second image data are not output.

* * * * *